United States Patent [19]

Wasserman

[11] 4,293,917

[45] Oct. 6, 1981

[54] NON-LINEAR FUNCTION GENERATOR

[75] Inventor: Philip D. Wasserman, Cupertino, Calif.

[73] Assignee: Stanford Associates, Inc., Menlo Park, Calif.

[21] Appl. No.: 97,913

[22] Filed: Nov. 28, 1979

[51] Int. Cl.³ .......................... G06F 1/02; G06F 15/31
[52] U.S. Cl. ...................................... 364/701; 364/718
[58] Field of Search ............... 364/701, 703, 718, 722; 235/92 CP

[56] References Cited

U.S. PATENT DOCUMENTS

| | | | |
|---|---|---|---|
| 3,636,336 | 1/1972 | Everett et al. | 364/701 X |
| 3,983,369 | 9/1976 | Katsuoka et al. | 364/718 |
| 3,988,600 | 10/1976 | Katsuoka et al. | 364/722 |
| 4,042,973 | 8/1977 | Caulfield et al. | 364/722 |
| 4,089,060 | 5/1978 | Mitchell | 364/701 |

Primary Examiner—David H. Malzahn
Attorney, Agent, or Firm—Jack M. Wiseman; Francis W. Anderson

[57] ABSTRACT

A function generator for producing digital data which represent a function of the time interval between two events and in which the digital data have a non-linear relationship to the time interval. The function generator comprises a rate multiplier circuit having a constant pulse frequency multiplicand and a continuously varying multiplier selected by a memory circuit throughout the time interval. A counter circuit has its input connected to the output of the rate multiplier circuit and has its output connected to the memory circuit to continuously address the memory circuit for selecting the continuously varying multiplier as each output pulse from the rate multiplier circuit is counted by the counter circuit. The data stored in the memory circuit for selecting the multiplier represents a series of straight line approximations to the desired continuous non-linear function. A digital feedback loop is formed between the rate multiplier circuit, the counter circuit and the memory circuit to cause a non-linear function to be generated by two events defining a time interval. At the completion of the time interval, the total count of pulses applied to the counter circuit is registered in a data storage device to provide digital data which represent a non-linear function of the time interval between two events.

16 Claims, 6 Drawing Figures

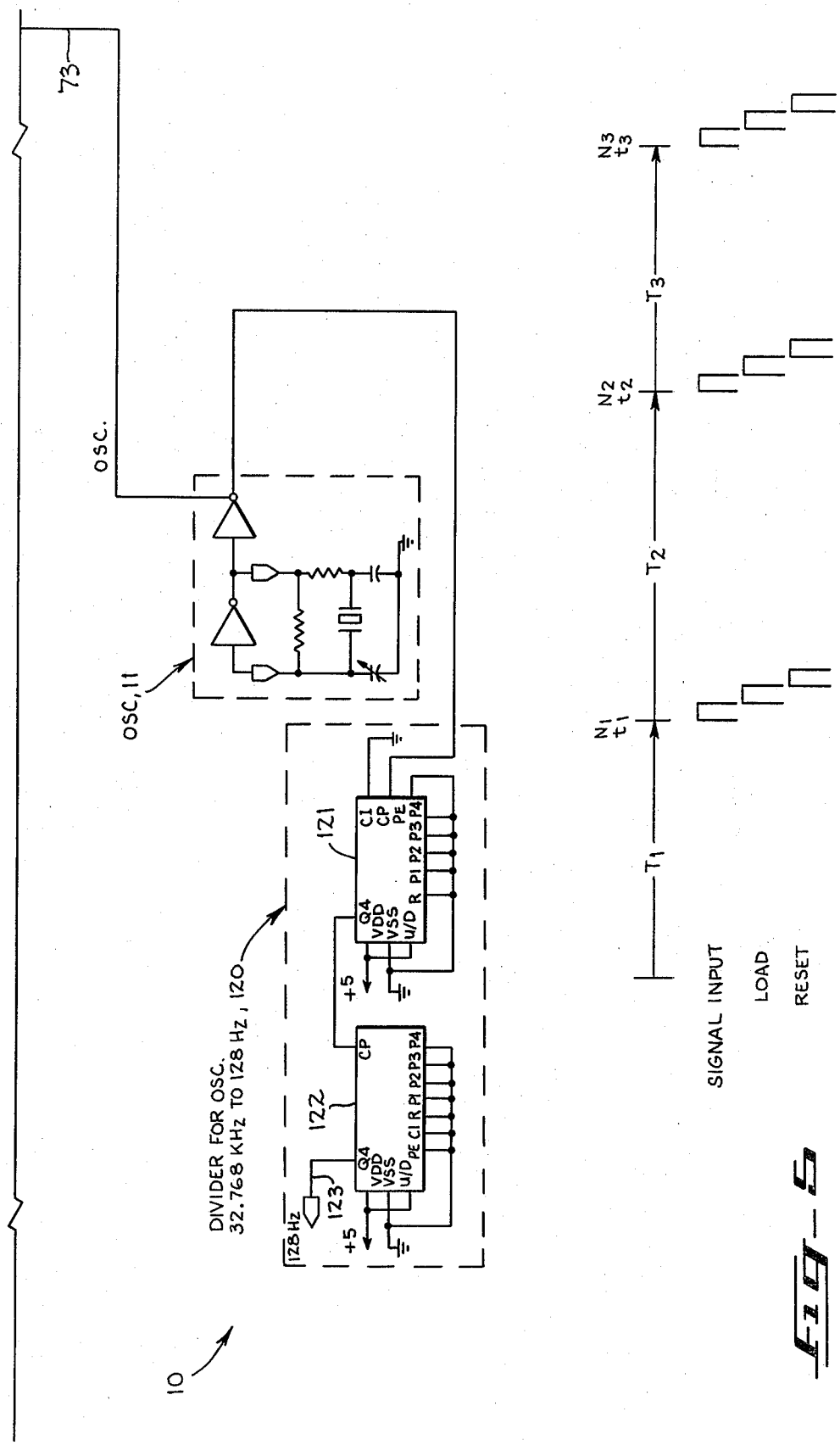

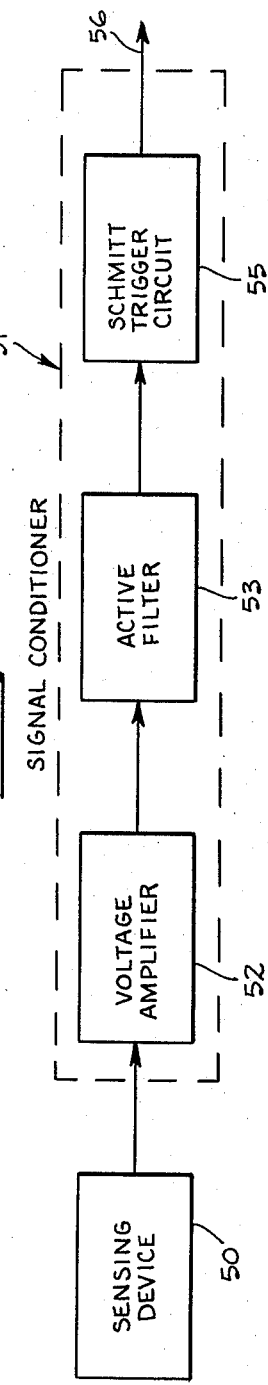
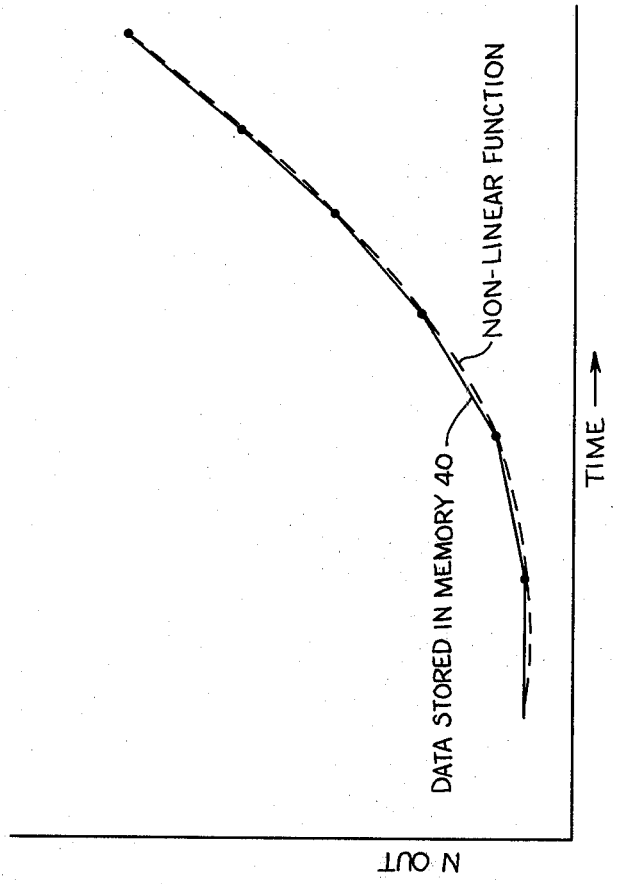

NON-LINEAR FUNCTION GENERATOR

BACKGROUND OF THE INVENTION

The present invention relates in general to function generators, and more particularly to a function generator for generating digital data which represent a function of the time interval between events.

In various apparatus, it is desirable to produce a digital readout which represents a function of the time interval between two events. For example, it may be desirable to have a digital readout representing the frequency associated with periodic functions of the human body, such as heart beats, respiration and the like. Heretofore, digital readouts of frequency were difficult to obtain, because conventional digital frequency measurement required the accumulation of input events in a period of time. This period must be long, in the case of heart beats and other low frequency signals, if adequate resolution is to be obtained. Alternatively, period can be measured quickly, but it has to have a non-linear (1/x) relationship to frequency.

Heretofore, digital or analog computers were employed to enable the generation of a digital readout from a non-linear time related signal. Such computers were of considerable complexity and cost.

When the digital readout represents a function of the time interval between two events and the relationship is linear with respect to a time interval, the desired functional relationship may be expressed as a linear equation, i.e., $N_{out} = A \Delta T$, where the $N_{out}$ is a digital readout; A is a coefficient of proportionality; and $\Delta T$ is the elapsed time between events. In this instance, a relatively simple time interval counter will produce the digital readout. However, in those instances in which the function of time represented by F(t) is a non-linear function of time, i.e., $1/T$, $T^2$, $N/T$, et cetera, the apparatus for producing a digital readout has been unduly complex.

SUMMARY OF THE INVENTION

A function generator for producing digital data which represent a non-linear function of the time interval between events. The function generator comprises a rate multiplier circuit having a constant pulse frequency multiplicand and a continuously varying multiplier selected by a memory circuit throughout the time interval. A counter circuit receives the output of the rate multiplier circuit and continuously addresses the memory circuit for selecting the continuously varying multiplier as each output pulse from the rate multiplier circuit is counted by the counter circuit. At the completion of the time interval, the total count of pulses applied to the counter circuit is applied to provide digital data which represent a non-linear function of the time interval between events.

A feature of the present invention is that the memory circuit stores data representing a series of straight line approximations to the desired non-linear function. In this manner, the quantity of data stored in the memory circuit is reduced to enable the memory circuit to be smaller and to lessen the complexity of the memory circuit.

Another feature of the present invention is that a digital feedback loop is formed between a rate multiplier circuit, a counter circuit and a memory circuit to cause a non-linear function to be generated by events occurring within a time interval.

An object of the present invention is to provide a function generator for producing digital data, which data represent a non-linear function of the time interval between events, and which function generator is economical to manufacture.

Another object of the present invention is to provide a function generator for producing digital data, which data represent a non-linear function of the time interval between events, and which function generator arrives at the desired result with fewer and less costly parts and yet has greater reliability and portability.

Another object of the present invention is to provide a function generator for producing digital data, which data represent a non-linear function of the time interval between events, and which function generator is digital throughout and, therefore, is suitable for integrated circuit techniques and implementation.

Another object of the present invention is to provide a function generator for producing digital data, which data represent a non-linear function of the time interval, and in which function generator the complexity of the memory circuit is reduced and the components of the memory circuit are reduced in number.

DESCRIPTION OF THE DRAWINGS

FIGS. 2A and 2B, when place side-by-side are a schematic diagram of the function generator shown in FIG. 1.

FIG. 3 is a block diagram of a sensing device and signal conditioner employed in the function generator shown in FIGS. 1, 2A and 2B for producing a pulse event.

FIG. 4 is a graphical illustration of the digital readout for a non-linear function occuring during an interval of time between two events to illustrate the use of a series of straight line approximations stored in the memory circuit for selecting the multiplier for a rate multiplying circuit, thereby approximating the desired non-linear function.

FIG. 5 is a diagrammatic illustration of pulse sequences with respect to time.

DESCRIPTION OF THE PREFERRED EMBODIMENT

Figure 1:
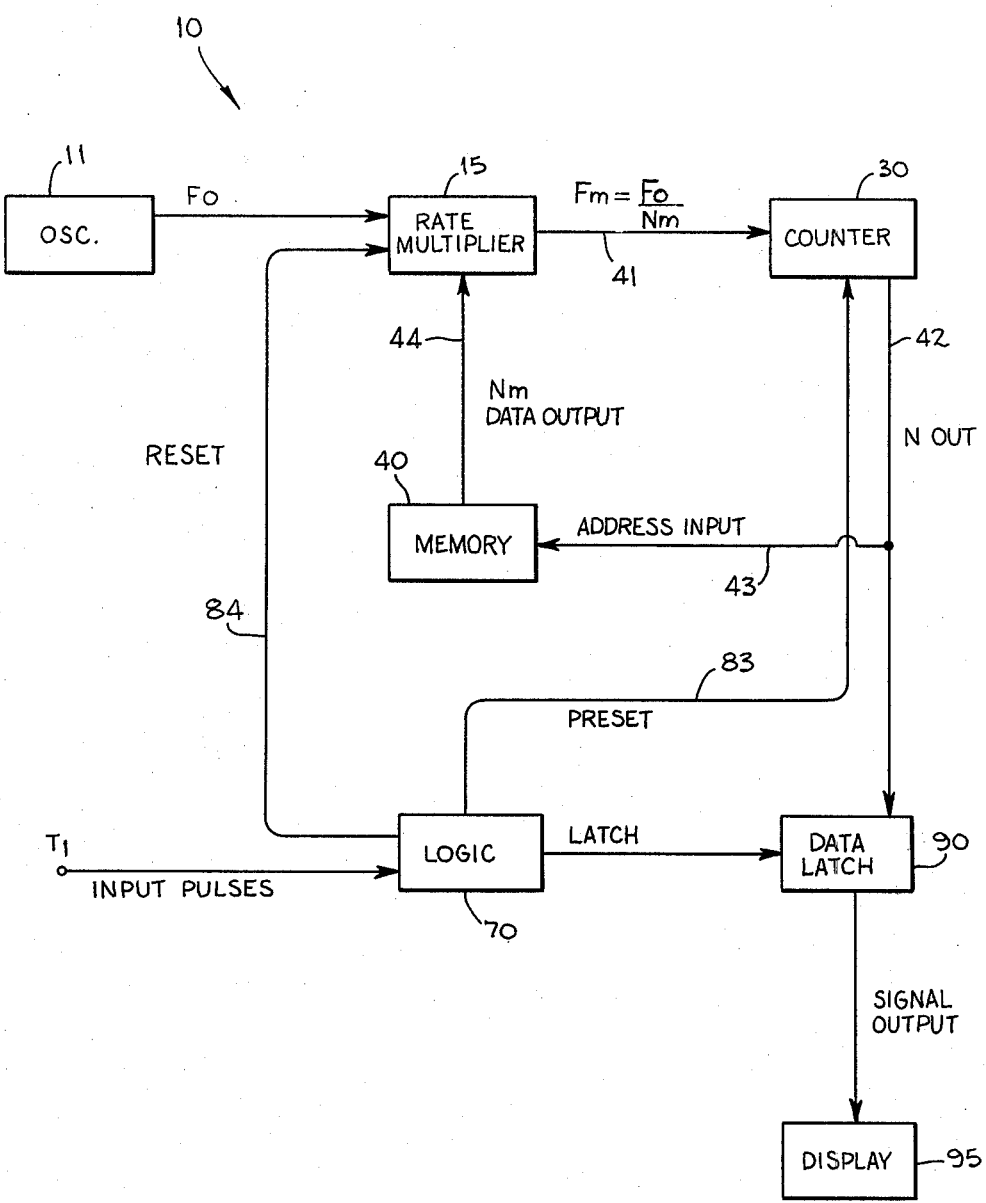
FIG. 1 is a block diagram of the function generator embodying the present invention.
Figure 2A:
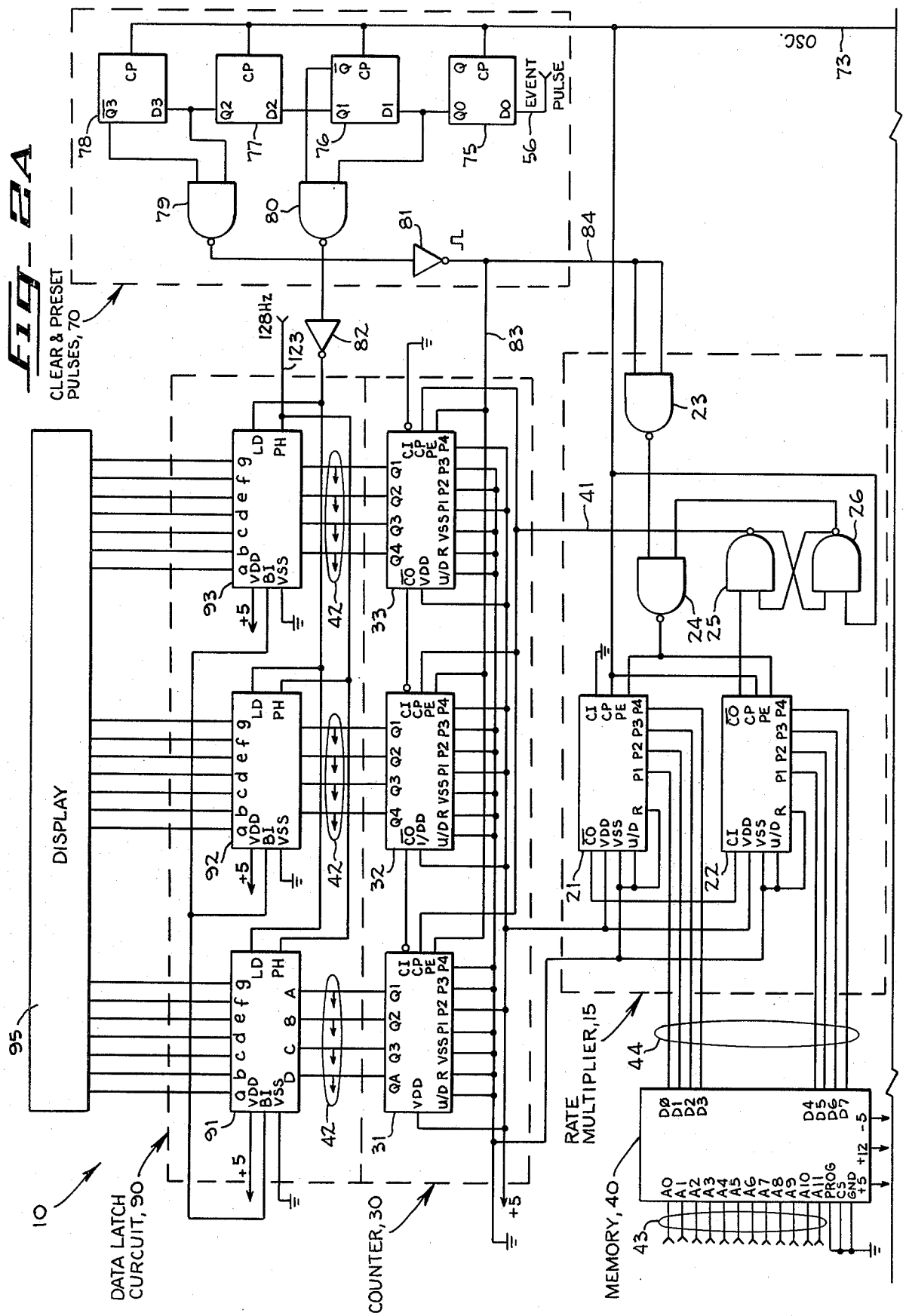

Illustrated in FIGS. 1, 2A and 2B is a non-linear function generator 10 embodying the present invention, which comprises a suitable stable oscillator or clock pulse generator 11. The oscillator 11 is a well-known crystal controlled oscillator and, in the exemplary embodiment, produces pulses at a constant frequency ($F_o$) of 32.768 KH$_z$.

A suitable rate multiplier 15 is connected to the output of the oscillator 11. In the exemplary embodiment, the well-known rate multiplier circuit 15 includes counter circuits 21 and 22 and NAND gates 23–26. The counter circuits may be of the type manufactured by RCA as CD 4516B counters. The multiplicand of the rate multiplier circuit 15 is the output of the oscillator 11.

Connected to the output of the rate multiplier circuit 15 is a suitable counter circuit 30. The counter circuit 30 comprises suitable counters 31–33. The counters may be of the type manufactured by Motorola Company as 14510B counters. A suitable read-only (ROM) memory circuit 40 is connected to the output of the counter circuit 30. In turn, the counter circuit 30 continuously addresses the memory circuit 40 in response to each pulse counted by the counter circuit 30.

Stored in the memory circuit 40 are data representing a series of straight line approximations to the desired non-linear function (FIG. 4). The counter circuit 30 addresses the memory circuit 40 as it counts each pulse from the output of the rate multiplier circuit 15. The memory circuit 40, in turn, selects the multiplier for the rate multiplier circuit 15 from data representing a series of straight line approximations stored therein. Therefore, as the counter circuit 30 counts each pulse from the output of the rate multiplier circuit 15, the memory circuit selects a multiplier for the rate multiplier circuit 15. Thus, the multiplier for the rate multiplier circuit 15 changes as the counter circuit 30 counts each pulse from the output of the rate multiplier circuit 15.

From the foregoing, it is to be observed that a digital feedback loop is formed between the rate multiplier circuit 15, the counter circuit 30 and the memory circuit 40. The digital feedback loop is over the following path: rate multiplier circuit 15, conductor 41, counter circuit 30, conductors 42, conductors 43, memory circuit 40, conductors 44 and back to the rate multiplier circuit 15.

Each event, such as at a time $t_1$ and $t_2$, is sensed by a sensing device 50 (FIG. 3) to produce a pulse signal. The pulse signal is amplified and conditioned by a signal conditioner circuit 51. Included in the signal conditioner circuit 51 is a suitable voltage amplifier 52, which is connected to the output of the sensing device 50. The sensing device 50 may be an OPB 710 sensor manufactured by Optron Corporation and the voltage amplifier 52 may be a 308 amplifier manufactured by RCA with suitable passive elements. Connected to the output of the voltage amplifier 52 is a suitable active filter 53, employing the TL 082 OP-AMP manufactured by Texas Instruments along with suitable passive elements. The output of the active filter 53 is applied to a Schmitt Trigger circuit 55.

The output of the Schmitt Trigger circuit 55 is applied to a logic circuit 70 over a conductor 56. Each event, such as at a time $t_1$ and $t_2$, causes the Schmitt Trigger circuit 55 to produce an output pulse. Each time the Schmitt Trigger circuit 55 produces an output pulse, an event pulse, such as at a time $t_1$ and $t_2$, is conducted over the conductor 56 to be applied to the logic circuit 70. The logic circuit 70 is a load and preset circuit. The logic circuit 70 upon receipt of an event pulse over the conductor 56 first causes the counter circuit 30 to be loaded into the latch-decoder-driver circuit 90. Then, the logic circuit 70 serves to preset the counter 30 and to reset the rate multiplier circuit 15. In the exemplary embodiment, the logic circuit 70 includes flip-flop circuits 75-78 of the type manufactured by Motorola as 14175B flip-flops. The event pulse conducted over the conductor 56 is applied to the flip-flop circuits 75-78 of the logic circuit 70, which forms a 4-bit shift register. The output circuits of the flip-flop circuits 75-78 are connected to NAND gates 79 and 80. The output of the NAND gate 79 is connected to an inverter circuit 81 and the output of the NAND gate 80 is connected to an inverter circuit 82. Upon receipt of an event pulse over conductor 56, a "one" state is sequentially shifted through the registers 75-78 of the logic circuit 70 by the clock pulse OSC over the conductor 73. When the output of the AND gate formed by the NAND gate 80 and the inverter circuit 82 is true, a load pulse is applied to a latch circuit 90. This causes the data in the counter 30 to be stored in the data latch circuit 90. Two pulses later, an AND gate composed of the NAND gate 79 and the inverter circuit 81 is in a "one" state and, a preset pulse from the logic circuit 70 is applied to the counter circuit 30 over a conductor 83 and a reset pulse is applied to the rate multiplier circuit 15 from the logic circuit 70 over a conductor 84. The sequence of the pulses at various events is shown diagrammatically in FIG. 5. Thus, one clock pulse after each event, the total count of pulses applied to the counter circuit 30 during the interval between events is registered in a data storage device, such as the latch-decoder-driver circuit 90.

Three clock pulses after each event, the counter 30 and the rate multiplier circuit 15 are preset. While a sequence of pulses is herein described, the clock period is selected to be low relative to the time between events. Hence, the latch-preset operation may be considered as occurring at a time coincident with the pulse event. In the exemplary embodiment, the latch-decoder-driver circuit 90 comprises suitable latch-decoder-driver circuits 91-93, which are manufactured by Motorola Corporation as the MC 14543B. The logic circuit 70 through the NAND gate 80 and the inverter circuit 82 applies a latch signal to apply the data stored in the latch circuit 90 to a suitable digital display 95. The digital display 95 displays a digital readout which represents a non-linear function of the time interval between two events, $t_1 - t_2$.

In the operation of the non-linear function generator 10, the logic circuit 70 presets the counter circuit 30 three clock pulses after an event pulse. In so doing, the counter circuit 30 has an initial starting count represented by the starting number No. The counter circuit 30 addresses the memory circuit 40 with the initial starting number Nos to select a multiplier $Nm\phi$ for the rate multiplier circuit 15. The multiplicand for the rate multiplier circuit 15 is a constant frequency Fo produced by the oscillator 11. $Tm\phi$, the elapsed time between the event pulse and the time the first pulse is applied to the counter circuit 30 over the conductor 41 by the rate multiplier circuit 15 may be represented as $Tm\phi = Nm\phi/Fo$. When the counter circuit 30 registers the first pulse from the rate multiplier circuit 15, it addresses the memory circuit 40 with a new number Nol. As a consequence thereof, the memory circuit 40 selects a multiplicand Nml for the rate multiplier circuit 15. The elapsed time between the first and second pulse outputs of the rate multiplier circuit is now represented by Tml=Nml/Fo. Thus, the general expression for the ith time interval between pulse events is represented by Tmi=Nmi/Fo. The time Tk for the counter circuit 30 to accumulate k pulses is:

$$Tk = \frac{Nm\phi}{Fo} + \frac{Nm1}{Fo} \ldots \frac{Nmk}{Fo}$$

or $$Tk = \frac{1}{Fo} \sum_{i=0}^{K} Nmi$$

At the time the second event pulse is received by the logic circuit 70 over the conductor 56 from the sensing device 50 and the signal conditioner 51, the counter circuit 30 registers k pulses. Hence, Nout=$N\phi$+k, in which $N\phi$ represents the initial or preset starting number for the counter circuit 30 and Nout represents the number registered by the counter circuit 30 at the time of the second event pulse. The number registered by the counter circuit 30 at the time of the second event pulse is latched in the data latch circuit 90 to be applied to the digital display 95 for giving a digital readout of non-linear function of the time interval between pulse events. The counter circuit 30 is preset as a consequence of each event pulse conducted over the conductor 56 from the sensing device 50 and the signal conditioner 51. The rate multiplier circuit 15 is reset as a consequence of each event pulse.

The accuracy with which Nout represents the desired F(t) depends upon the correct selection of the coefficient Nmi and the number of bits comprising this number. If desired, by using only high order bits of the counter circuit 30 to address the memory circuit 40, the size of the memory circuit 40 can be greatly reduced. In the present invention, the output number Nm$\phi$ of the counter circuit 30 addressing the memory circuit 40 causes the memory circuit 40 to select as a multiplier for the rate multiplier circuit 15 a series of straight-line approximations to the desired F(t) (FIG. 4).

By presetting the counter circuit 30 to N$\phi$, functions may be produced which are not equal to zero at T=0. Counter circuit 30 can be selected to count either up or down from N$\phi$ by implementing either increasing or decreasing functions of the time interval between events. If the counter circuit 30 were composed of two counters, one of which counts either up or down as commanded by the output of the memory 40 and drives the display 95, and a second counter which counts only up and drives the address inputs of the memory 40, the counter 30 could be employed to allow the generation of functions which are double valued in the independent variable T, which is the time between events.

The output of the data latch circuit 90 is applied to the digital display 95 for displaying the results of the signal processing of pulse events by the function generator 10. In the exemplary embodiment, the display 95 may be a liquid crystal display, such as MLC 210 liquid crystal display manufactured by Motorola. Other suitable and well-known digital displays may be employed equally as well. The output of the data latch circuit 90 may also be in the form of binary or binary coded signals for further processing by digital data handling systems. If desired, the data latches may be deleted and digital data taken directly from the counter 30. This would require accepting the data within one clock pulse after the load pulse or in the alternative require adding circuitry to stop the counting process as data is being read.

A frequency divider circuit 120 receives the output signal of the oscillator 120, which is 32.768 KHz in the exemplary embodiment, and produces in its output a 128 Hz signal. The frequency divider circuit 120 includes counter circuits 121 and 122, which is of the type manufactured by the Motorola Company as CD 4516B. The 128 Hz signal is employed to drive the backplane of the liquid crystal display 95 and is optional with respect to other types of displays.

The NAND gates 25 and 26 of the rate multiplier circuit 15 form a set-reset flip-flop circuit, which is set by the output OSC of the oscillator 11. The OSC output pulses are conducted over the conductor 73. A preset pulse is applied from the logic circuit 70 through the NAND gate 23 and NAND gate 24 to the counter circuits 21 and 22 of the rate multiplier circuit 15 to preset the counter circuits 21 and 22 to the number Nmo coming from the memory circuit 40. The counter circuits 21 and 22 then count down from Nmo until a count of zero is reached. At that time, the flip-flop circuit formed by the NAND gates 25 and 26 is reset. The output of the NAND gate 26 is then applied through the NAND gate 24 to once again preset the counters 21 and 22 to the number Nml. Thus, each time the counters 21 and 22 count to zero, counters 31–33 of the counter circuit 30 are advanced one count which changes the address to the memory 40 and a new number Nmi is preset into the counter circuit 30. The time required for the counters 21 and 22 of the rate multiplier circuit 15 to count to zero is therefore Nmi/Fo, the desired function.

Should it be desired to average out the time function, a conventional signal divider circuit and a clock divider circuit can be added in a conventional and well-known manner. When it is preferred to delay the operation of the function generator 10 until a regular signal is received, a conventional and well-known start-up circuit can be provided in a well-known manner. Should it be desired to provide a display pulse indicator, a conventional pulse indicator display can be provided.

I claim:

1. A function generator comprising:
   (a) a rate multiplier circuit having a constant pulse frequency multiplicand:
   (b) a memory circuit connected to said rate multiplier circuit and storing data for selecting the multiplier for said rate multiplier circuit;
   (c) a counter circuit connected to the output of said rate multiplier circuit for counting the output pulses thereof and connected to said memory circuit for continuously addressing said memory circuit in response to the output pulses of said rate multiplier circuit to select a continuously varying multiplier for said rate multiplier circuit; and
   (d) means connected to the output of said counter circuit to receive the pulses counted by said counter circuit for presenting a non-linear function with respect to a time interval.

2. A function generator as claimed in claim 1 wherein said counter circuit addresses said memory circuit as it counts each pulse from the output of said rate multiplier circuit for selecting the multiplier for said rate multiplier circuit.

3. A function generator as claimed in claim 1 and comprising a logic circuit connected to said counter circuit to preset said counter circuit to an initial count for addressing said memory circuit to select an initial multiplier for said rate multiplier circuit, means connected to said logic circuit for applying a first and a second event pulse, said logic circuit in response to a first event pulse resets the operation of said rate multiplier circuit and in response to a second event pulse latches the output pulse count of said counter circuit to said means for presenting a non-linear function between event pulses.

4. A function generator as claimed in claim 1 wherein the connections between said rate multiplier circuit, said memory circuit and said counter circuit define a digital feedback loop.

5. A function generator as claimed in claim 1 wherein said memory circuit stores straight line approximations as data for selecting the multiplier for said rate multiplier circuit.

6. A function generator as claimed in claim 5 wherein said counter circuit addresses said memory circuit as it counts each pulse from the output of said rate multiplier circuit for selecting the multiplier for said rate multiplier circuit.

7. A function generator as claimed in claim 2 and comprising a logic circuit connected to said counter circuit to preset said counter circuit to an initial count for addressing said memory circuit to select an initial multiplier for said rate multiplier circuit, means connected to said logic circuit for applying a first and a second event pulse, said logic circuit in response to a first event pulse resets the operation of said rate multiplier circuit and in response to a second event pulse latches the output pulse count of said counter circuit to said means for presenting a non-linear function between event pulses.

8. A function generator as claimed in claim 2 wherein the connections between said rate multiplier circuit, said memory circuit and said counter circuit define a digital feedback loop.

9. A function generator comprising:
(a) a rate multiplier circuit having a constant pulse frequency multiplicand represented by Fo;
(b) a memory circuit connected to said rate multiplier circuit and storing data for selecting the multiplier for said rate multiplier circuit;
(c) a counter circuit connected to the output of said rate multiplier circuit and connected to said memory circuit for continuously addressing said memory circuit to select a continuously varying multiplier for said rate multiplier circuit, the multipliers selected by said memory circuit for said rate multiplier circuit during a time interval $Tmi$ is represented by $Nmi$; and
(d) means connected to the output of said counter circuit to receive the pulses counted by said counter circuit for presenting a non-linear function with respect to the time interval $Tmi = Nmi/Fo$.

10. A function generator as claimed in claim 9 wherein said memory circuit stores straight line approximations as data for selecting the multiplier for said multiplier circuit.

11. A function generator as claimed in claim 9 and comprising a logic circuit connected to said counter circuit to preset said counter circuit to an initial count for addressing said memory circuit to select an initial multiplier for rate multiplier circuit represented by $Nm\phi$, the multiplier for said rate multiplier circuit selected by said memory circuit in response to said counter circuit addressing said memory circuit after said counter circuit has a first pulse applied thereto by said rate multiplier circuit is represented by $Nm1$, the multiplier for said rate multiplier circuit selected by said memory circuit in response to said counter circuit addressing said memory circuit after said counter circuit receiving k pulses from said rate multiplier circuit is represented by $NmK$, the time interval $Tk$ for said counter circuit to accumulate k pulses is equal to $$\frac{Nm\phi}{Fo} + \frac{Nm1}{Fo} \cdots \frac{2\,NmK}{Fo}$$

which is equal to $$\frac{1}{Fo} \sum_{i=0}^{K} Nmi$$

12. A function generator as claimed in claim 10 wherein said memory circuit stores straight line approximations as data for selecting the multiplier for said rate multiplier circuit.

13. A function generator comprising:
(a) a rate multiplier circuit having a constant multiplicand;
(b) a memory circuit connected to said rate multiplier circuit for selecting the multiplier for said rate multiplier circuit;
(c) first means connected to the output of said rate multiplier circuit and to said memory circuit for addressing said memory circuit in response to the output of said rate multiplier circuit to select a multiplier for said rate multiplier circuit; and
(d) second means responsive to the output of said first means for presenting a non-linear function with respect to a time interval.

14. A function generator as claimed in claim 13 wherein said memory circuit stores straight line approximations as data for selecting the multiplier for said rate multiplier circuit.

15. A function generator as claimed in claim 14 wherein said first means continuously addresses said memory circuit to select a continuously varying multiplier for said rate multiplier circuit.

16. A function generator as claimed in claim 15 wherein the connections between said rate multiplier circuit, said memory circuit and said first means define a digital feedback loop.

* * * * *